(12) United States Patent
Hanashima et al.

(10) Patent No.: US 6,916,024 B2
(45) Date of Patent: Jul. 12, 2005

(54) GASKET

(75) Inventors: Kanji Hanashima, Hamamatsu (JP);
Kenichi Takahiro, Hamamatsu (JP);
Hideshi Shibata, Hamamatsu (JP);
Hideaki Mori, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 10/627,282

(22) Filed: Jul. 25, 2003

(65) Prior Publication Data

US 2004/0021272 A1 Feb. 5, 2004

(30) Foreign Application Priority Data

Jul. 31, 2002 (JP) ........................................ 2002-222913

(51) Int. Cl.⁷ .............................. F16L 17/00; F16L 5/02; F16L 17/06; F16J 15/02
(52) U.S. Cl. ...................... 277/602; 277/606; 277/608; 277/612; 277/626; 277/644; 277/653
(58) Field of Search ................................ 277/602, 606, 277/608–609, 612, 626–627, 644, 628, 647–649, 650, 653

(56) References Cited

U.S. PATENT DOCUMENTS 5,240,263 A * 8/1993 Nicholson ................... 277/614
5,354,072 A * 10/1994 Nicholson ................... 277/647
6,131,915 A * 10/2000 Nicholson ................... 277/593
6,431,825 B1 * 8/2002 McLean ..................... 415/135

FOREIGN PATENT DOCUMENTS

GB          2235260 A  *  2/1991  ............ F16J/15/06
JP         57192669 A  * 11/1982  ............ F16J/15/08

* cited by examiner

Primary Examiner—Alison Pickard
Assistant Examiner—Vishal Patel
(74) Attorney, Agent, or Firm—Flynn, Thiel, Boutell & Tanis, P.C.

(57) ABSTRACT

In order to provide a gasket which can be repeatedly used over a temperature range in which a rubber gasket cannot be used, which does not have any risk of damaging a flange, and which can follow the change of the distance between flanges, a gasket is constructed in such a way that two metallic coned disc springs each of which has a circulation opening for a fluid in a central portion and each of which is formed into a seal surface in which an outer peripheral portion with respect to the circulation opening rises having an arc-like curved surface are combined while being oppositely directed and have outer diameter peripheral edge portions which are welded and fixed so that by tightening flanges, repulsive force of the two coned disc springs concentratedly affects the seal surfaces consisting of the arc-like curved surfaces, and a tight fluid seal is formed between the flange surfaces.

8 Claims, 4 Drawing Sheets

GASKET

BACKGROUND OF THE INVENTION

1. Field of the Invention

The present invention relates to an improvement on a metal gasket which is suitable for preventing a fluid from leaking in a vacuum equipment employed for semiconductor manufacturing equipment, nuclear equipment, and the like.

2. Description of the Related Art

Conventionally, a rubber gasket has been generally employed as a sealant for a connecting portion in piping or a valve, a lid of a vacuum chamber, a reaction vessel for semiconductor manufacturing, or the like.

For a portion at a high temperature (200° C. or more) at which rubber gasket cannot be used or a portion which is in contact with a fluid which deteriorated rubber, a metal gasket for example such as a metal O-ring, a spring-inserted metal C-ring, knife-edge type metal gasket, or the like is employed.

The above-described metal gaskets are not necessarily able to cope with use conditions described below.

(a) In the case where the distance between flanges changes when in use, for example, in the case where the distance between flanges changes due to thermal expansion, applied pressure, vibration, or the like, such change cannot be followed, thereby causing the inability of sealing.

(b) In the case where a portion such as a lid of a reaction vessel or a gate valve on which opening and closing is repeated is sealed, for example a metal O-ring is crushed after being used once and cannot be used repeatedly.

(c) When a conventional metal gasket is used, it is not possible to increase a tightening load by structurally making the thickness of a flange thicker, making the diameter of a bolt increased, making the number of bolts increased, or the like.

(d) The material of a flange portion is soft such as aluminum and the like, so that there is a risk that a scar is formed on the flange portion when the tightening load is increased.

(e) Although a spring-inserted metal C-ring has a large elastic recovery amount, can be used repeatedly, and can follow the change in the distance between flanges to some extent, it is expensive.

SUMMARY OF THE INVENTION

The present invention has been made in order to solve inconveniences of a conventional metal gasket, and it is an object to provide a metal gasket which can be repeatedly used over a temperature range in which a rubber gasket cannot be used, which does not have any risk of forming a scar on a flange surface, which can follow the change of the distance between flanges, and which can be manufactured inexpensively.

In order to accomplish the above-described objective, in a gasket according to a first aspect of the invention, two metallic coned disc springs each of which has a circulation opening for a fluid in a central portion and each of which is formed into a seal surface in which an outer peripheral portion with respect to the circulation opening rises having an arc-like curved surface are combined while being oppositely directed and have outer diameter peripheral edge portions which are welded and fixed.

In a gasket according to a second aspect of the invention, two metallic coned disc springs each of which has a circulation opening for a fluid in a central flat portion and each of which is formed into a seal surface in which an outer diameter peripheral edge portion warps having an arc-like curved surface are combined while being oppositely directed on the flat surface portions having the circulation openings and are welded and fixed.

In a gasket according to a third aspect of the invention, a gasket comprises a first metallic coned disc spring which has a circulation opening for a fluid in a central portion and which is formed into a seal surface in which an outer peripheral portion with respect to the circulation opening rises having an arc-like curved surface, a second metallic coned disc spring having a circulation opening for a fluid in a central flat portion, and a third metallic coned disc spring which has a circulation opening for a fluid in a central flat portion and which is formed into a seal surface in which an outer diameter peripheral edge portion warps having an arc-like curved surface, wherein the second coned disc spring is combined with the first coned disc spring while both are oppositely directed so that the outer diameter peripheral edge portions thereof are welded and fixed, and the third coned disc spring is combined with the second coned disc spring while both are oppositely directed so that the central flat portions thereof are welded and fixed.

With the present invention, since a coned disc spring having a seal surface formed into an arc-like curved surface is a constituent element, it is possible to provide a gasket which can be suitable for all of conditions described below.

(1) The case where sealing is performed over a temperature range in which a rubber gasket cannot be employed or a fluid which deteriorated rubber is sealed.
(2) The case where repeated use is performed.
(3) The case where the tightening load cannot be increased (when in a structurally difficult condition, and when a soft material such as aluminum is employed).
(4) The case where the distance between flanges changes.
(5) It can be obtained inexpensively compared to a spring-inserted C-ring.

DESCRIPTION OF THE PREFERRED EMBODIMENTS

Figure 1:
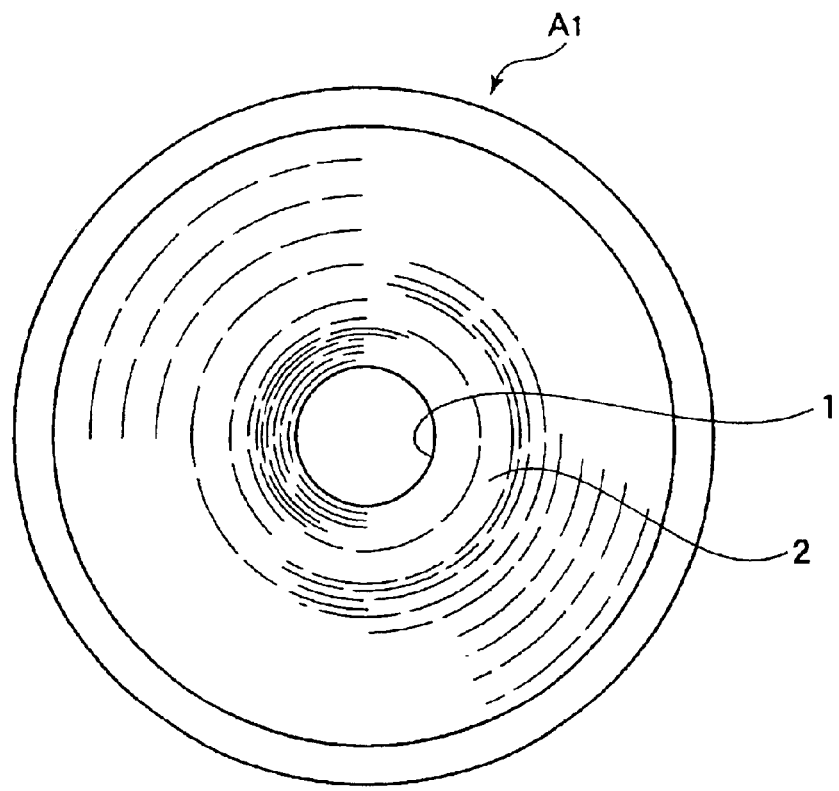
FIG. 1 is a plan view of a gasket showing one embodiment of the present invention.
Figure 2:
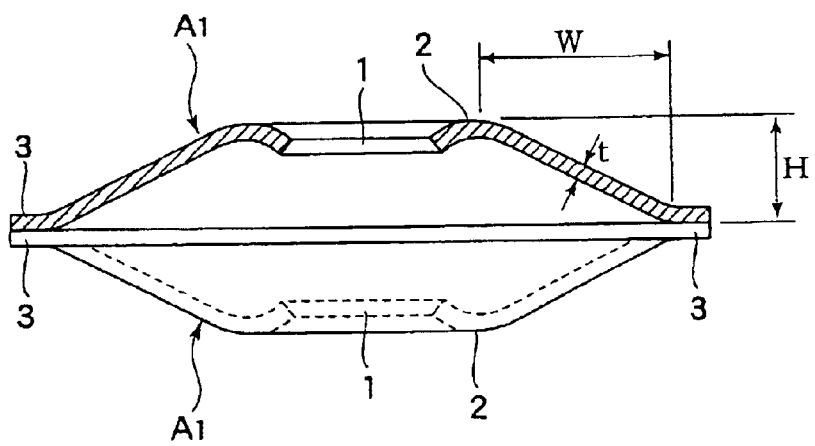
FIG. 2 is a side elevational view in partial cutaway of FIG. 1.

As a preferred embodiments of the present invention, as shown in FIGS. 1–2, a gasket is constructed in such a way that two metallic coned disc spring $A_1, A_1$ each of which has a circulation opening 1 for a fluid in a central portion and each of which is formed into a seal surface 2 in which an outer peripheral portion with respect to the circulation opening 1 rises having an arc-like curved surface are combined while being oppositely directed, and that outer diameter peripheral edge portions 3 thereof are welded and fixed.

FIGS. 1 to 4 show one embodiment of a gasket according to the present invention.

The gasket of the present embodiment consists of two metallic coned disc springs $A_1$, $A_1$ which have the same shape, an outer diameter of 30 mm, and a thickness of 1.5 mm.

A material of the coned disc spring $A_1$ can be arbitrarily selected from a heat resistant alloy, such as Inconel, and stainless steel, pure nickel, aluminum, spring steel, and the like, to be used.

With respect to the shape of the coned disc spring $A_1$, there is the circulation opening 1 for a fluid in the central portion thereof, and the outer peripheral portion with respect to the circulation openings 1 rises having an arc-like curved surface to become the seal surface 2 which abuts a flange. This seal surface 2 has R=0.1 to 10 mm, its surface is polished (barrel polishing, electrolytic polishing, electrolytic combined polishing, buff polishing, and the like), and the surface roughness thereof Ra is 0.1 μm or less.

The two coned disc springs $A_1$, $A_1$ are superimposed while being oppositely directed on the outer diameter peripheral edge portion 3 thereof and are fixed by seam welding (resistance welding, ultrasonic welding, laser welding, plasma welding, and the like) to construct a gasket.

Figure 4:
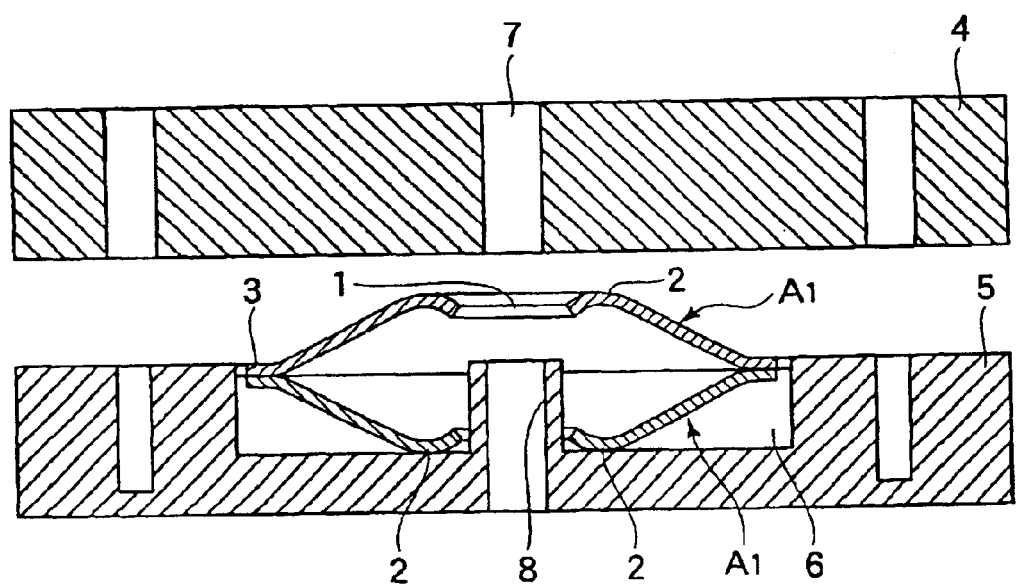
FIG. 4 is a cross-sectional view of a state where the gasket is disposed on a flange.
Figure 5:
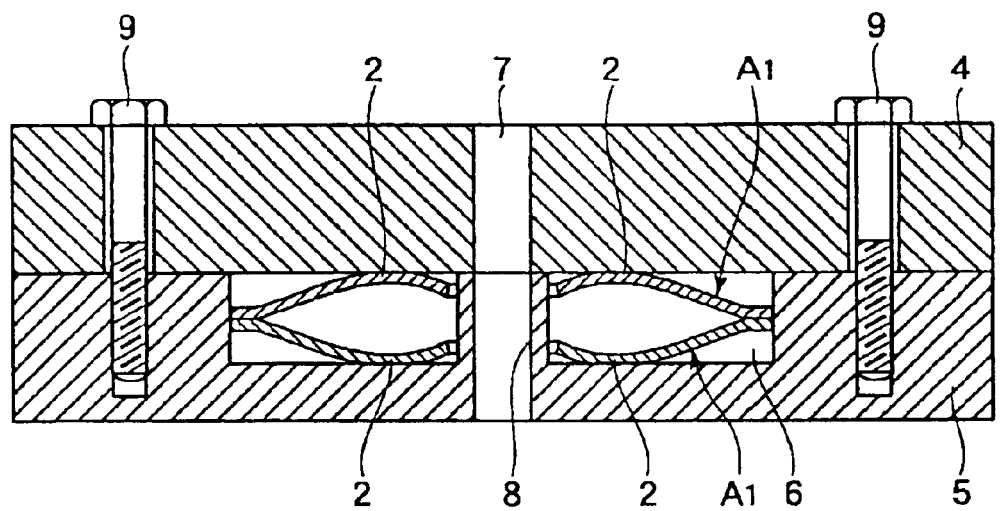
FIG. 5 is a cross-sectional view of a state where the gasket is compressed by tightening of a flange.

FIGS. 4 to 5 show an example of using the gasket with said structure.

In the drawings, the reference numerals 4, 5 denote opposing flanges, which are constructed in such a way that there is a groove 6 for disposing the gasket on one flange 5 so that a circulation path 7 on the flange 4 side and a cylindrical circulation path 8 positioned on the center of the groove 6 of the flange 5 side are communicated with each other in the inner side of the central circulation openings 1 of the coned disc springs $A_1$, $A_1$.

Thus, when the flange 4 is superimposed on the flange 5 on which the gasket is disposed to be tightened by means of bolts 9, the two coned disc springs $A_1$, $A_1$ constructing the gasket are compressed and deformed elastically, and the seal surfaces 2, whose R becomes large, are abutted abutting surfaces of the flanges suppressively, so that a fluid seal is formed thereon as shown in FIG. 5.

Figure 6:
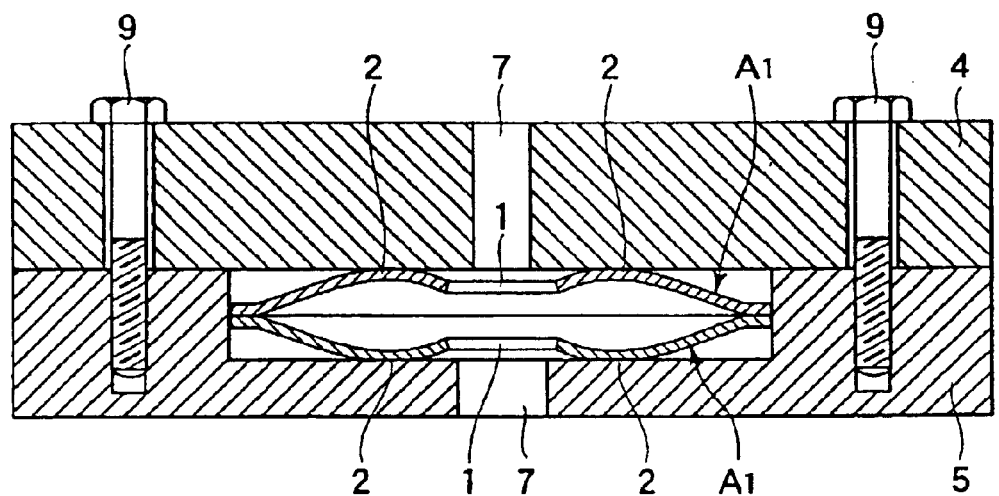
FIG. 6 is a cross-sectional view showing an example of modification of FIG. 5.
Figure 7:
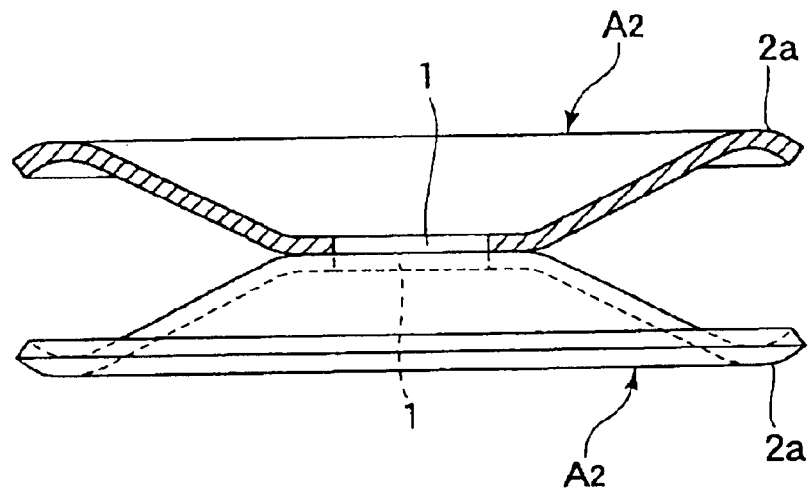
FIG. 7 is a side elevational view in partial cutaway of a gasket showing another embodiment of the present invention.

The cylindrical circulation path of the flange 5 in FIG. 6 may be the same circulation path as the circulation path 7 of the flange 4 as shown in FIG. 7.

With the structure of the gasket in which the two coned disc springs $A_1$, $A_1$ are superimposed while being oppositely directed and in which the seal surfaces 2 rising having the arc-like curved surfaces are formed on the outer peripheral portions with respect to the central circulation openings 1 of the coned disc springs as described above, by tightening of the flanges, repulsive force of the two coned disc springs concentratedly affects the seal surfaces consisting of the arc-like curved surfaces so that a tight fluid seal is formed between the flange surfaces.

In the structure of the above-described gasket, the repulsive force of the gasket can be controlled easily by each size of wall thickness t, height H, width W of the coned disc spring $A_1$ and the like as shown in FIG. 2. The H/W of the coned disc spring is preferred to be 0.2 to 1.0, and when it is 1.0 or more, spring characteristics cannot be imparted.

The gasket shown in FIG. 2 is effective in the case where the pressure of an inner peripheral side is higher than that of an outer peripheral side of the gasket. The gasket is pushed up from the inner side due to internal pressure so that the flanges and the seal surfaces are easy to be brought into close contact with each other.

Figure 3:
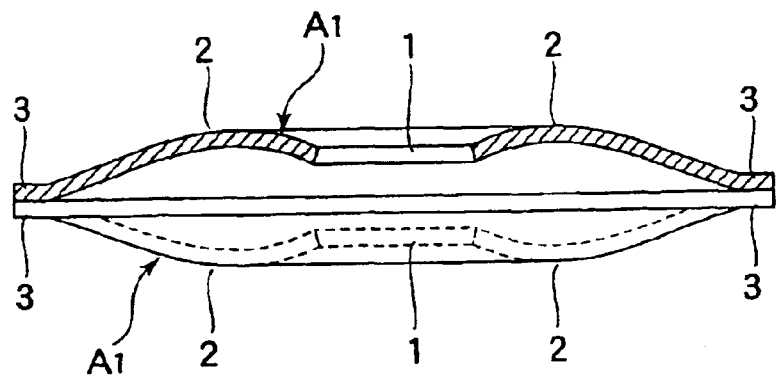
FIG. 3 is a side elevational view in partial cutaway of a gasket showing a compressed state.

FIG. 7 shows another embodiment of the present invention. The members in FIG. 7 which are the same as or similar to those in FIGS. 1 to 3 are designated by like reference numerals.

The gasket of this embodiment is constructed in such a way that two metallic coned disc springs $A_2$, $A_2$ each of which has the circulation opening 1 for a fluid in a central flat portion and each of which is formed into a seal surface 2a in which an outer diameter peripheral edge portion warps having an arc-like curved surface are superimposed while being oppositely directed on the central flat portions having the circulation openings 1 and are welded through seam welding.

With respect to the gasket with the structure described above, repulsive force of the two coned disc springs affects the seal surfaces 2a concentratedly by tightening of the flanges so that a tight fluid seal is formed between the flange surfaces.

The gasket with the structure shown in FIG. 7 has a structure effective in the case where the outer peripheral side pressure is higher than the inner peripheral side pressure.

Figure 8:
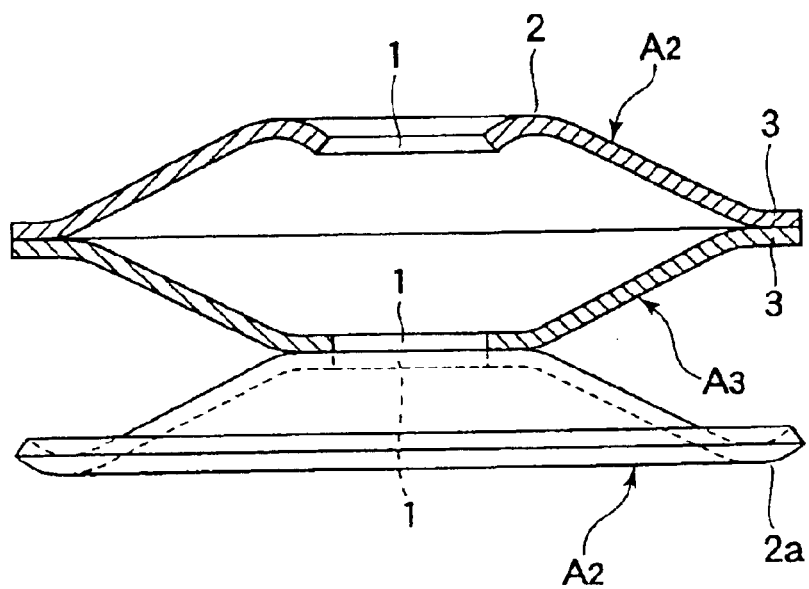
FIG. 8 is a side elevational view in partial cutaway of a gasket showing yet another embodiment of the present invention.

FIG. 8 shows yet another embodiment of the present invention. The members in FIG. 8 which are the same as or similar to those in FIGS. 1 to 2 and FIG. 7 are designated by like reference numerals.

The gasket of this embodiment is constructed in such a way that coned disc springs $A_3$ having circulation openings 1 for a fluid in central flat portion of the coned disc spring $A_1$ of FIGS. 1 to 2 are superimposed while being oppositely directed on the outer diameter peripheral edge portions 3 and are welded by seam welding and that the coned disc spring $A_2$ of FIG. 7 is superimposed while being oppositely directed on the central flat portion of the coned disc spring $A_3$ and is welded by seam welding.

With respect to the gasket of the above structure, a tight fluid seal with the flange surfaces is formed by the seal surface 2 formed on the central portion of the coned disc spring $A_1$ and the seal surface 2a formed on the outer diameter peripheral edge portion 3 of the coned disc spring $A_3$.

With respect to the gasket of the structure shown in FIG. 8, when the ratio of the width to the height of the groove on which the gasket is embedded (height/width) is large, and when the H/W of the coned disc spring becomes 0.1 or more, not two but three or more springs can be superimposed to make the H/W small, and spring characteristics can be imparted.

What is claimed is:

1. A gasket comprising two metallic coned disc springs each of which has a central circulation opening therethrough for a fluid in a central portion and each of which is formed into a seal surface in which a peripheral portion about the circulation opening rises having an arc-like curved surface, the surface being inclined upwardly and extending outwardly in a radial direction from the circulation opening, and the surface then being inclined downwardly and extending outwardly in the radial direction to an outer diameter peripheral edge portion, the two coned disc springs being combined while being oppositely directed in a state where the arc-like curved surfaces do not cross each other, and the outer diameter peripheral edge portions being welded and joined about the circumferences thereof.

2. The gasket of claim 1, wherein the central circulation openings are in axial alignment with each other.

3. The gasket of claim 2, wherein the central circulation openings are circular.

4. The gasket of claim 1, wherein each said coned disc spring includes said circulation opening and a large opening defined by the outer peripheral edge portion before said coned disc springs are joined about the respective peripheral edge portions.

5. A gasket comprising two metallic coned disc springs having identical shapes, each said disc spring having a circulation opening for a fluid in a central flat portion and each of which is formed into a seal surface that extends outwardly and upwardly from the flat portion and warps near an outer diameter peripheral edge portion to define an arc-like curved surface, the two coned disc springs being combined while being oppositely directed on the central flat portions having the circulation openings, the central flat portions being welded and joined with each other.

6. The gasket of claim 5, wherein the central circulation openings are in axial alignment with each other.

7. The gasket of claim 6, wherein the central circulation openings are circular.

8. A gasket comprising a first metallic coned disc spring which has a circulation opening for a fluid in a central portion and which is formed into a seal surface in which an outer peripheral portion with respect to the circulation opening rises having an arc-like curved surface, a second metallic coned disc spring having a circulation opening for a fluid in a central flat portion, and a third metallic coned disc spring which has a circulation opening for a fluid in a central flat portion and which is formed into a seal surface in which an outer diameter peripheral edge portion warps having an arc-like curved surface, wherein the second coned disc spring is combined with the first coned disc spring while both are oppositely directed so that the outer diameter peripheral edge portions thereof are welded and fixed, and the third coned disc spring is combined with the second coned disc spring while both are oriented so that the central flat portions thereof are welded and fixed.

* * * * *